UNITED STATES PATENT OFFICE.

GEORGE E. DUNTON, OF NEW YORK, N. Y.

COMPOSITION OF MATTER FOR USE IN REMOVING GREASE, &c., FROM MOLDS USED IN THE ART OF ELECTROTYPING.

1,030,290.     Specification of Letters Patent.     Patented June 25, 1912.

No Drawing.     Application filed July 22, 1910. Serial No. 573,294.

*To all whom it may concern:*

Be it known that I, GEORGE E. DUNTON, residing at New York, county of New York, State of New York, a citizen of the United States, have invented certain new and useful Improvements in Composition of Matter for Use in Removing Grease, &c., from the Molds Used in the Art of Electrotyping; and I do hereby declare the following to be a full, clear, and exact description of the invention, such as will enable others skilled in the art to which it pertains to make and use the same.

The material for forming molds used in the electrotyping art for the production of printing plates is commonly made of some substance such as beeswax, ozokerite wax or like material which contains an appreciable percentage of grease, oil or oily substance in their composition.

When pressure is applied to a form or cut in making the impression in the mold, it causes the grease or oily substance to be forced out and appear on the face of the mold in the form of a thin coating or film, said coating or film is very troublesome and annoying to the electrotyper as it causes imperfect and faulty reproductions, especially in case where the so-called half tone illustrations are being made which are composed or made up of a collection of very fine dots.

My invention relates to a new and useful composition for curing the above fault which is especially adapted for use in dissolving, disintegrating and removing grease, oil or other fatty substances from the pressed surfaces of wax molds used in the art of electrotyping preparatory to applying a black lead or other coating to the mold.

The composition consists of the following ingredients:—

Methyl alcohol _____ 8 quarts.
Chlorin water _____ 3 pints.
Sodium chlorid dissolved in water
    to saturation _____ 1 quart.
Hydrochloric acid about 20 degrees
    Baumé _____ ¼ pint.
Water _____ 1 quart.

In compounding the composition, I first provide a suitable receptacle and pour into the same 8 quarts of methyl alcohol and to this alcohol add 3 pints of chlorin water, which is free chlorin gas dissolved in water to saturation, next put one quart of water into a mixing receptacle and add to it while constantly stirring 6 ounces of sodium chlorid and after the water has taken up or dissolved all that it can pour the whole of the salt solution into the alcohol and chlorin water solution, stirring briskly for a few moments, and then finally add, still stirring, ¼ of a pint of hydrochloric acid and keep up the stirring until no bubbles appear or come to the surface.

This composition is to be placed in a lead lined trough or receptacle of sufficient size to take the largest size mold, when it is ready for use, but it should be stirred occasionally to keep the chlorin element from sinking or gravitating to the bottom and forming a strata at the lower level of the composition.

The composition may be poured over the surface of the wax mold or the mold may be immersed or dipped into the composition as is desired.

The above composition acts to break up and dissolve the constituent parts of the grease, oil or other substance appearing on the surface of the mold and destroys the cohesion between the several elements composing the grease, oil or other substance so as to permit of its easy removal from the surface of the mold.

The action depends upon the affinities of nascent chlorin for hydrogen and the attraction of oxygen for sodium, and the presence of a flux which assists these actions on the elements composing the grease.

I do not wish to confine myself to the exact proportion of each ingredient as stated, as they may be varied, or to the use of sodium as any of the chlorinated salts, such for instance as potassium, calcium, barium or other inorganic salt may be used, also other combinations may be made to produce the same results, and still come within the scope and spirit of my invention.

What I claim is:—

1. A composition the constituent ingredients of which are methyl alcohol, sodium chlorid, chlorin and hydrochloric acid, substantially as described.

2. A composition the constituent ingredients of which are methyl alcohol, a saturated solution of sodium chlorid dissolved in water, free chlorin gas dissolved in water and hydrochloric acid, substantially as described.

3. A composition the constituent ingredients of which are methyl alcohol 8 quarts, chlorin water 3 pints, saturated solution of sodium chlorid 1 quart and ¼ of a pint of hydrochloric acid, substantially as described.

In testimony whereof, I affix my signature in the presence of two witnesses.

GEORGE E. DUNTON.

Witnesses:
 FRANCIS S. DUFF,
 H. BECKER.

---

Copies of this patent may be obtained for five cents each, by addressing the "Commissioner of Patents, Washington, D. C."

---

Hutchinson, 542,524, July 9, 1895 (87-5, Stone),

Despain, 404,387, June 4, 1889 (87-5, Wood),

Dane, 362,942, May 17, 1887 (87-5, Wall).